Patented Sept. 12, 1933

1,926,632

UNITED STATES PATENT OFFICE 1,926,632

PROCESS FOR THE PREPARATION OF KETONES FROM ESTERS

Koloman Róka, Konstanz, Germany, assignor, by mesne assignments, to Deutsche Gold- und Silber-Scheideanstalt vormals Roessler, Frankfort-on-the-Main, Germany, a corporation of Germany No Drawing. Application March 13, 1930, Serial No. 435,657, and in Germany June 20, 1925

14 Claims. (Cl. 260—134)

It is well known that acids can be converted into ketones by heating them to elevated temperatures in the presence of metallic oxides. For example, acetic acid on being heated to an elevated temperature in the presence of calcium oxide yields acetone.

According to this invention, ketones are prepared from esters by heating an ester, for example, methyl acetate or ethyl acetate, and water vapor to elevated temperatures of 400° C. or more in the presence of catalysts, such as metallic oxides or compounds convertible in whole or in part to metallic oxides under the conditions of the reaction. Among the catalysts which are effective in the invention may be mentioned the oxides of iron, manganese, and zinc, as well as oxides or oxygen compounds of, for example, calcium, strontium, barium and magnesium. Various mixtures of these metallic oxygen compounds have also been found to be very effective.

If methyl acetate or ethyl acetate is subjected to this reaction in the presence of calcium oxide or calcium carbonate, preferably precipitated on carriers such as pumice stone at elevated temperatures of 450° to 600° C., the acetic acid which is present in the ester is converted into acetone practically quantitatively, while the alcohol of the ester, methyl alcohol or ethyl alcohol, as the case may be, is recovered.

This invention is illustrated by the following examples:

1. A reaction tube is filled with pumice stone, on which calcium carbonate has been precipitated, and is heated to 550° C. A mixture of equal parts by weight of ethyl acetate and water are passed through the reaction tube in the form of their vapors at a velocity of 100 grams per liter of reaction space. The vapors leaving the tube are condensed. The yield of acetone is 90% of the theory. The yield of methyl alcohol is almost quantitative.

This process of converting esters into ketones possesses special advantages when it is applied to the treatment of diluted raw materials such as crude pyroligneous acid which contains on the average only about 9% to 10% of acetic acid. In the direct ketonizing of this highly diluted acetic acid solution, the whole mass of water must be heated to a high temperature and the acetone so obtained is very impure.

The above described invention makes it possible to convert crude pyroligneous acid into an ester such as methyl acetate, which ester can easily be separated from the impurities which it contains, and to convert the purified ester into comparatively pure acetone with recovery of the methyl alcohol.

Furthermore, it is possible to convert esters into ketones by a reaction in which the alcohol component of the ester also takes part. For example, if ethyl acetate is subjected to the reaction described above, using catalysts such as iron, iron oxide, oxidized iron and the like, at temperatures of about 475° C., for example, not only does the acetic acid contained in the ester under treatment take part in the formation of the acetone, but also the ethyl alcohol, so that more acetone is formed than corresponds to the amount of acetic acid used. The alcohol which has not been converted into acetone is recovered. If the reaction is carried out under the same conditions but at a higher temperature, for example, at about 510° C., it is possible to convert practically all of the ethyl acetate into acetone.

In the carrying out of the process of this invention, mixed catalysts have been found to be especially suitable, for example, such as contain on the one hand catalysts like oxidized iron, and which contain such catalysts as calcium oxide or calcium carbonate on the other hand.

The ability to convert esters, such as ethyl acetate, into ketones, such as acetone, almost quantitatively, is very surprising, since on the one hand the saponification of acetic ester in the vapor phase is well known to take place very incompletely because the equilibrium point is displaced toward the ester side, while on the other hand it was unexpected that alcohol could be converted into acetone directly.

2. The reaction tube is filled with rusty iron chips on which calcium carbonate has been precipitated, and is then heated to 510° C. A mixture of equal parts by weight of ethyl acetate and water is passed through the reaction tube in the form of their vapors at a velocity of 100 grams per liter of reaction space. The vapors leaving the tube are condensed. The yield of acetone is 85% of the theory.

In the above example the oxidized iron may be replaced by other oxides such as zinc or manganese oxide while the calcium carbonate may be replaced by oxygen compounds of such metals as strontium, barium and magnesium. Further mixtures of iron oxide with oxides of zinc, manganese, nickel and the like have been found to be effective. The presence of small amounts of iron in the technical oxides of zinc, manganese, and the like, as they are found in commerce will be seen to be of no disadvantage for their use in the present invention.

The process is not limited to the preparation of acetone, but may be used in the preparation of many other ketones including higher ketones and mixed ketones by treating the corresponding esters.

The working up of dilute solutions of raw material such as crude pyroligneous acid can be carried out advantageously in the following manner. First, the methyl alcohol contained in the raw material is separated. Then it is esterified with ethyl alcohol and the ethyl acetate so obtained, preferably purified, may be worked up into acetone under conditions that will convert practically all of the ester into acetone.

By the process of this invention, it is also possible to ketonize esters in admixture with other ketonizable substances, such as ethyl alcohol, acetaldehyde, acetic acid, and so forth. The ketonizing of esters or mixtures of esters, as the case may be, which contain other ketonizable substances in addition to the esters, can also be carried out successfully when foreign substances are present such as methyl alcohol and the like, which do not take part in the ketonizing reaction and which do not disturb the reaction. This discovery makes it possible to work up mixtures which occur in commerce occasionally without the necessity of separating these mixtures beforehand into their constituents and without working them up in any preliminary way whatsoever.

In the preparation of acetone from ethyl acetate the reaction can be carried out in such a way that a product is obtained consisting mainly of acetone and which contains, in addition, very small amounts of ester and acetaldehyde, as well as small amounts of ethyl alcohol and acetic acid. It is merely necessary to separate the acetone from this mixture, while the remaining constituents can be led back into the reaction without being separated and can be subjected to further ketonizing with fresh ethyl acetate.

In view of the possibility of utilizing the by-products again, the ketonizing process can be carried out to advantage in such a way that less stress is placed upon the obtaining of high yields and instead large quantities of the raw materials are passed through the tube and thus greater production is obtained without having to take into consideration losses or disturbing side reactions.

The discovery that the ketonizing reaction can be carried out in the presence of certain foreign substances which do not take part in the reaction, can be made use of in the production of certain valuable ketone mixed products. For example, in the presence of methyl alcohol the reaction can be made to produce acetone-methyl alcohol mixtures which are known to be excellent solvents and which may be used directly as such without separation into their constituents.

A further discovery has been made that the catalysts can be activated by treating them at elevated temperatures with oxygen or oxygen-containing gas mixtures, such as air, for example. One method of carrying out this phase of the invention is to interrupt the ketonizing reaction when the activity of the catalysts has fallen off and to pass air or a mixture of air and water vapor over the catalysts at temperatures of about 500° C. When oxygen is no longer absorbed, or when it is no longer absorbed in appreciable amounts, the regeneration process can be stopped and the ketonizing process continued. In this way the original high yields are again obtained. It is especially advantageous to activate the catalysts after short intervals; that is, at times when a cessation or a marked diminution in the activity of the catalyst has not yet appeared. In this way high yields of ketones are continuously obtained. The life of the catalyst can also be lengthened without interrupting the ketonizing reaction by mixing small amounts of air together with the reaction mixture consisting, for example, of ester and water vapor which is passed through the tube.

In the treatment of ethyl acetate according to this invention, in addition to acetone a gas mixture is obtained which consists of two-thirds hydrogen and one-third carbon dioxide. The hydrogen which is formed can be used by itself or if desired, in admixture with the carbon dioxide, as an aid in the carrying out of the ketonizing reaction. It can be used, for example, for heating the reaction tube. If some air is passed through the reaction tube together with the ester-water vapor mixture, a part of the hydrogen which is formed is burned in the reaction space. Instead of using it for interior heating, the hydrogen leaving the reaction vessel may be used with or without the carbon dioxide for exterior heating of the reaction vessel. Also interior and exterior heating may be combined.

It will be apparent that the invention broadly comprises a process of preparing ketones by heating mixtures of a vapor of an ester of an aliphatic acid with a monohydric alcohol and water vapor at temperatures between about 400° C. and about 600° C. in the presence of oxygen compounds of metals.

This application is a continuation-in-part of my application Serial No. 115,683, filed June 12, 1926.

I claim:

1. Process of preparing ketones which comprises heating mixtures of a vapor of an ester of an aliphatic acid with a monohydric alcohol and water-vapor at temperatures between about 400 and about 600° C. in the presence of catalytic metal oxides.

2. Process of preparing ketones which comprises heating mixtures of a vapor of an ester of an aliphatic acid with a monohydric alcohol and water-vapor at temperatures between about 400 and 600° C. in the presence of a plurality of catalytic metal oxides.

3. Process of preparing ketones which comprises heating mixtures of a vapor of an ester of an aliphatic acid with a monohydric alcohol and water-vapor at temperatures between about 400 and about 600° C. in the presence of catalytic metal oxides precipitated on a carrier.

4. Process of preparing ketones which comprises heating mixtures of a vapor of an ester of an aliphatic acid with a monohydric alcohol and water-vapor at temperatures between about 400 and about 600° C. in the presence of oxygen compounds of iron of the group consisting of the oxides and compounds convertible to the oxides under the conditions of the reaction.

5. Process of preparing ketones which comprises heating mixtures of a vapor of an ester of an aliphatic acid with a monohydric alcohol and water-vapor at temperatures between about 400 and about 600° C. in the presence of oxygen compounds of calcium of the group consisting of the oxides and compounds convertible to the oxides under the conditions of the reaction.

6. Process of preparing ketones which comprises heating mixtures of a vapor of an ester of an aliphatic acid with a monohydric alcohol and water-vapor at temperatures between about 400 and about 600° C. in the presence of oxygen compounds of iron and calcium of the group consisting of the oxides and compounds convertible to the oxides under the conditions of the reaction.

7. Process of preparing ketones which comprises heating mixtures of a vapor of an ester of an aliphatic acid with a monohydric alcohol and water-vapor at temperatures between about 400 and about 600° C. in the presence of oxygen compounds of iron treated with oxygen compounds of calcium of the group consisting of the oxides and compounds convertible to the oxides under the conditions of the reaction.

8. Process of preparing ketones which comprises reacting esters of aliphatic acids with monohydric alcohols, other aliphatic substances, convertible into ketones, and water in the form of their vapors between about 400 and about 600° C. in the presence of catalytic metallic oxides.

9. Process of preparing a ketone-methyl-alcohol mixture which comprises reacting an ester of an aliphatic acid with a monohydric alcohol, other aliphatic substances, convertible into ketones, methyl-alcohol and water in the form of their vapors at temperatures between about 400 and about 600° C., in the presence of catalytic metallic oxides.

10. Process of preparing actone which comprises reacting a vapor of an ester of acetic acid with a monohydric alcohol and water-vapor at temperatures between about 400 and about 600° C. in the presence of catalytic metal oxides.

11. Process of preparing ketones which comprises reacting vapors of an ester of an aliphatic acid with a monohydric alcohol and water-vapor at temperatures between about 400 and about 600° C. in the presence of catalytic metal oxides and a small amount of air.

12. Process of preparing ketones which comprises passing a mixture of a vapor of an ester of an aliphatic acid with a monohydric alcohol and water-vapor over a catalyst consisting of a catalytic metallic oxide in a reaction tube heated to temperatures between about 400 and about 600° C., condensing the vapors leaving the tube, separating the ketone from the mixture so obtained, and passing the remaining constituents through the reaction tube again in admixture with further quantities of the ester.

13. Process according to claim 12, in which the catalyst is reactivated from time to time when its efficiency has diminished, by interrupting the ketonizing reaction for a short time and passing an oxygen containing gas over the catalyst.

14. Process according to claim 12, in which the catalyst is reactivated from time to time when its efficiency is diminished, by interrupting the ketonizing reaction for a short time and passing a mixture of an oxygen containing gas and water-vapor over the catalyst.

KOLOMAN RÓKA.